(12) United States Patent
Zhao et al.

(10) Patent No.: US 12,219,371 B2
(45) Date of Patent: Feb. 4, 2025

(54) METHOD AND SYSTEM FOR NETWORKING OF SPLICED BUILDING BLOCKS, AND SPLICED BUILDING BLOCKS APPLICABLE TO WIRELESS NETWORKING

(71) Applicant: SHANGHAI BLOKS TECHNOLOGY GROUP CO., LTD., Shanghai (CN)

(72) Inventors: Jialiang Zhao, Shanghai (CN); Chao Gao, Shanghai (CN); Ye Xiao, Shanghai (CN); Shanjun Deng, Shanghai (CN); Song Liu, Shanghai (CN); Chang Liu, Shanghai (CN); Shanjun Li, Shanghai (CN); Chenlu Liu, Shanghai (CN)

(73) Assignee: SHANGHAI BLOKS TECHNOLOGY GROUP CO., LTD., Shanghai (CN)

( * ) Notice: Subject to any disclaimer, the term of this patent is extended or adjusted under 35 U.S.C. 154(b) by 344 days.

(21) Appl. No.: 17/762,039

(22) PCT Filed: Aug. 31, 2020

(86) PCT No.: PCT/CN2020/112437
§ 371 (c)(1),
(2) Date: Mar. 18, 2022

(87) PCT Pub. No.: WO2021/052154
PCT Pub. Date: Mar. 25, 2021

(65) Prior Publication Data
US 2022/0338030 A1   Oct. 20, 2022

(30) Foreign Application Priority Data
Sep. 18, 2019   (CN) .......................... 201910882958.0

(51) Int. Cl.
*H04W 24/02* (2009.01)
*H04L 41/12* (2022.01)

(52) U.S. Cl.
CPC ............. *H04W 24/02* (2013.01); *H04L 41/12* (2013.01)

(58) Field of Classification Search
None
See application file for complete search history.

(56) References Cited

U.S. PATENT DOCUMENTS

2003/0235175 A1* 12/2003 Naghian ............. H04L 63/0853
370/338
2004/0215687 A1* 10/2004 Klemba ................ H04W 52/46
709/200

(Continued)

FOREIGN PATENT DOCUMENTS

CN   101772983 A   7/2010
CN   103532877 A   1/2014

(Continued)

*Primary Examiner* — Pamit Kaur
(74) *Attorney, Agent, or Firm* — Bayramoglu Law Offices LLC

(57) ABSTRACT

A method and system for networking of spliced building blocks, and the spliced building blocks applicable to wireless networking are provided. The method includes a step of first network establishment: according to a first configuration instruction, instructing mutual networking among communication nodes of spliced building blocks belonging to a first set to obtain a first network, where the first configuration instruction comes from a locality or an external intelligent terminal; and a step of second network establishment: according to a second configuration instruction, instructing mutual networking among communication nodes of spliced building blocks belonging to a second set in the first network to obtain a second network, where the second configuration instruction is transmitted by the first network, both the first (Continued)

network and the second network are wireless networking networks, and the data transmission efficiency of the second network is higher than the data transmission efficiency of the first network.

14 Claims, 4 Drawing Sheets

(56) References Cited

U.S. PATENT DOCUMENTS

| | | |
|---|---|---|
| 2007/0223430 A1 | 9/2007 | Desai et al. |
| 2011/0286424 A1 | 11/2011 | Jeon et al. |
| 2015/0351146 A1 | 12/2015 | Lee et al. |
| 2017/0136380 A1 | 5/2017 | Creedican |
| 2018/0280822 A1 | 10/2018 | Murthy et al. |

FOREIGN PATENT DOCUMENTS

| | | | |
|---|---|---|---|
| CN | 105007587 A | | 10/2015 |
| CN | 106488520 A | | 3/2017 |
| CN | 107070690 A | | 8/2017 |
| CN | 107134205 A | * | 9/2017 |
| CN | 108476050 A | | 8/2018 |
| CN | 108654116 A | | 10/2018 |
| CN | 109348494 A | | 2/2019 |
| CN | 109663371 A | | 4/2019 |
| CN | 107148130 B | | 7/2019 |
| CN | 209392741 U | | 9/2019 |
| EP | 2575324 A1 | | 4/2013 |
| EP | 2768269 A1 | | 8/2014 |
| JP | H10108985 A | | 4/1998 |
| JP | 2006524974 A | | 11/2006 |
| JP | 2010500845 A | | 1/2010 |
| JP | 2017530848 A | | 10/2017 |
| WO | 2017037765 A1 | | 3/2017 |

* cited by examiner

METHOD AND SYSTEM FOR NETWORKING OF SPLICED BUILDING BLOCKS, AND SPLICED BUILDING BLOCKS APPLICABLE TO WIRELESS NETWORKING

CROSS REFERENCE TO THE RELATED APPLICATIONS

This application is the national phase entry of International Application No. PCT/CN2020/112437, filed on Aug. 31, 2020, which is based upon and claims priority to Chinese Patent Application No. 201910882958.0, filed on Sep. 18, 2019, the entire contents of which are incorporated herein by reference.

TECHNICAL FIELD

The present invention relates to the field of control of building block splicing, and in particular to a method and system for networking of spliced building blocks, and the spliced building blocks applicable to wireless networking.

BACKGROUND

Childhood is short but wonderful. Childhood experience remains a memory to be recalled and tasted during one's growth. Fantastic thoughts during childhood also inspire invention of creative and original intelligent performance. Undoubtedly, spliced building blocks will make the childhood interesting, motivate "young inventors" to make brainstorm and dedicated themselves to "creation" of spliced building blocks with diverging thoughts. As the science and technology make progress with each passing day, together with gradual arrival of the era of 5G and flourishing of artificial intelligence, spliced building blocks are also undergoing a revolution. Static building blocks without other functions, which are only of the form as an object often cannot bring children very good experience of personal immersion. R&D experts are motivated to research and develop spliced building blocks by children's needs for having immersive experience in the spliced building blocks. At present, there are intelligent spliced building blocks which have a function of transformation, consist of "energy modules" and have the ability to move by themselves. However, the intelligent spliced building blocks have a lot of execution assemblies and sensing assemblies, which request information interactions. Communication methods in the prior art do not take into account the special application scene of the intelligent spliced building blocks. It is urgent to solve the problem about how to maximize network resource utilization during networking of the intelligent spliced building blocks and how to realize networking of the spliced building blocks in a scientific and rational manner.

Patent Literature CN107148130B discloses a form-type ZigBee self-networking method. Through a method of form query and GPS automatic positioning, gateways and control nodes in a street lamp control system can be automatically networked. Users or manufacturers do not need to make manual networking or configuration of equipment in the system as they are automatically generated by a platform. The patent literation refers to networking, but fails to consider particularity of the spliced building blocks, so it is not applicable to networking of the spliced building blocks.

SUMMARY

Aiming at defects in the prior art, the purpose of the present invention is to provide a method and system for networking of spliced building blocks, and the spliced building blocks applicable to wireless networking.

The present invention provides a method for networking of spliced building blocks. The method includes a step of first network establishment: according to a first configuration instruction or an own attribute, instructing mutual networking among communication nodes of spliced building blocks belonging to a first set to obtain a first network, wherein the first configuration instruction comes from a locality or an external intelligent terminal; and/or a step of second network establishment: according to a second configuration instruction or an own attribute, instructing mutual networking among communication nodes of spliced building blocks belonging to a second set in the first network to obtain a second network, wherein the second configuration instruction is transmitted by the first network, both the first network and the second network are wireless networking networks, and data transmission communication quality of the second network is higher than data transmission communication quality of the first network.

Preferably, the method includes a step of identifying increase or decrease of the building blocks: identifying and obtaining information of increase or decrease of the building blocks relative to the first set; and a step of adjusting increase or decrease of the first network: according to the information of increase or decrease of the building blocks, increasing or decreasing the communication nodes in the first network correspondingly.

Preferably, the step of adjusting increase or decrease of the first network includes any one or more of the following steps: a step of actively joining the first network: allowing the increased communication nodes to actively join the first network; a step of actively exiting from the first network: allowing the communication nodes in the first network to actively exit from the first network; a step of joining the first network under hardware triggering: with hardware triggering as a condition, allowing the first network to increase the communication nodes; a step of exiting from the first network under hardware triggering: with hardware triggering as a condition, allowing the first network to decrease the communication nodes; a step of controlling joining the first network: allowing the increased communication nodes to join the first network by the external intelligent terminal; and a step of controlling exiting from the first network: allowing the decreased communication nodes to exit from the first network by the external intelligent terminal.

Preferably, the method includes a step of disconnecting the existing network: allowing the increased communication nodes to join the current first network after exiting from the original first network by the external intelligent terminal.

Preferably, the method includes a step of external adjustment of the first network: according to a logic amendment instruction of the external intelligent terminal, adjusting a topological structure of the first network and/or a topological structure of the second network.

Spliced building blocks applicable to wireless networking provided according to the present invention include a building block assembly and communication nodes, wherein the communication nodes are disposed in the building block assembly; and each of the communication nodes includes a first network communication module: configured to establish or join a first network according to a first configuration instruction of a locality of the communication node or an external intelligent terminal; and/or a second network communication module: configured to establish or join a second network according to a second configuration instruction from the first network or the locality of the communication node, wherein both the first network and the second network are wireless networking networks, and the data transmission efficiency of the second network is higher than the data transmission efficiency of the first network.

Preferably, each of the communication nodes includes a second network configuration module, and the second network configuration module includes a first network node information obtaining module: configured to obtain communication node information of the first network; and a second configuration instruction generation module: configured to generate a second configuration instruction according to the communication node information of the first network, wherein the second configuration instruction instructs a communication node set needing to be networked into the second network.

Preferably, the communication node set includes any one or more of the following communication nodes: a communication node with the corresponding building block assembly serving as a sensing assembly; a communication node with the corresponding building block assembly serving as an execution assembly; a communication node designated by the external intelligent terminal; and a communication node with a data communication traffic larger than a set threshold.

Preferably, establishment of the first network is started in any of the following ways: establishment of the first network is started after the communication nodes are powered on; establishment of the first network is started under designation of the external intelligent terminal; and establishment of the first network is started according to historical networking information stored by the communication nodes. Establishment of the second network is started in any of the following ways: establishment of the second network is started after establishment of the first network; establishment of the second network is started under designation of the external intelligent terminal; establishment of the second network is started when a data volume in need of transmission is larger than a set threshold; and the second network is re-established or adjusted after conversion of a topological structure of the first network.

In comparison with the prior art, the present invention has the following beneficial effects:

1. The present invention takes into full account the particularity of communication networking in the spliced building blocks and similar scenes, thereby making up defects in the prior art in a targeted manner.

2. The present invention can distinguish communication needs of different assemblies and adopt different communication schemes under different communication requirements, so that better resource configuration is achieved.

3. The present invention solves the problem that it is difficult to meet requirements of sudden large data size transmission by networks such as Mesh, while the cost is reduced based on the solution.

BRIEF DESCRIPTION OF THE DRAWINGS

Other features, purposes and advantages of the present invention will become more apparent by reading the detailed descriptions of non-restrictive embodiments with reference to the following drawings.

DETAILED DESCRIPTION OF THE EMBODIMENTS

Figure 1:
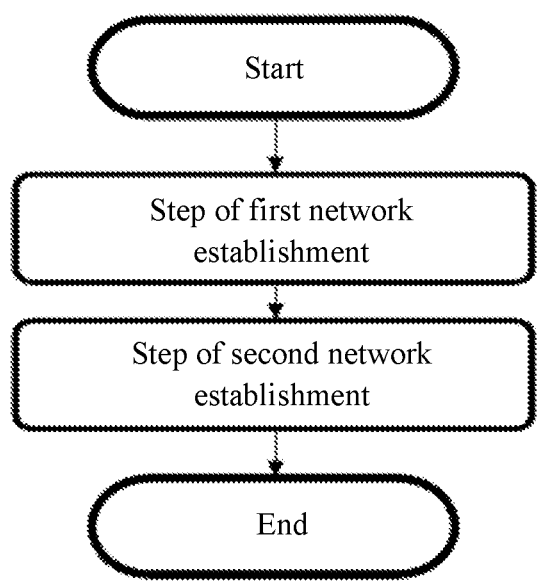
FIG. 1 is a flow diagram of the present invention.
Figure 2:
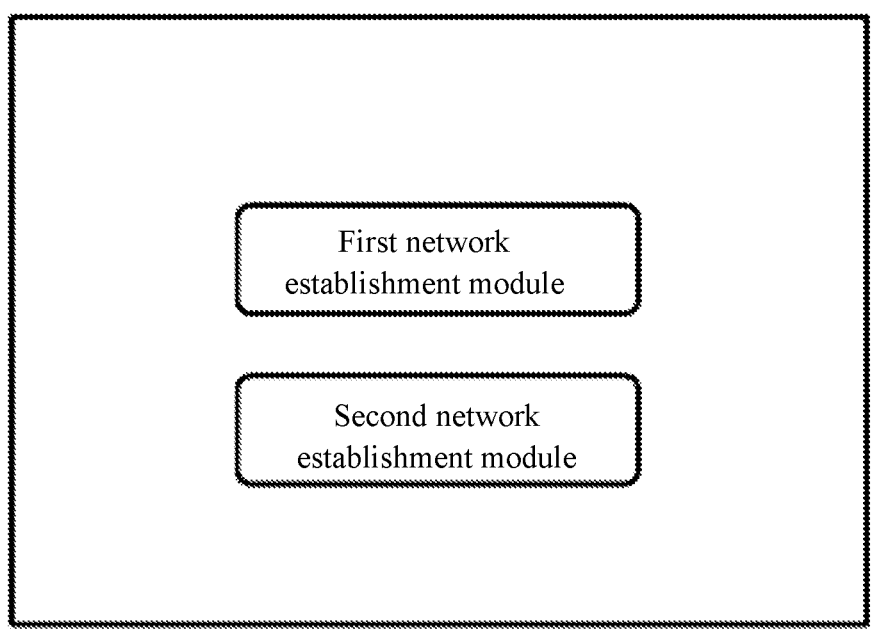
FIG. 2 is a framework diagram of the present invention.

The present invention will be described in detail in conjunction with specific embodiments. The following embodiments will help those skilled in the art further understand the present invention, rather than limit the present invention in any form. It should be pointed out that those of ordinary skill in the art can make several changes and improvements without departing from concepts of the present invention. All the contents fall into the scope of protection of the present invention.

According to a method for networking of spliced building blocks provided by the present invention, the method includes the following steps: a step of first network establishment: according to a first configuration instruction or an own attribute, instructing mutual networking among communication nodes of spliced building blocks belonging to a first set to obtain a first network. The first set may be a set of a plurality of spliced building blocks that have been spliced in hardware (these building blocks may be identified by electrical connection of physical contact); or, according to attributes of the spliced building blocks (for example, an attribute range is set, and only the building blocks that need to transmit data, such as execution assemblies and sensing assemblies, belong to the first set, while ordinary building blocks without electronic modules are not included in the first set); or, a plurality of spliced building blocks specified by a mobile phone. The first configuration instruction comes from a locality or an external intelligent terminal. External intelligent terminals, such as mobile phones, pads, smart glasses, smart watches, or intelligent terminals dedicated for splicing smart toys. And/or the method includes a step of second network establishment: according to a second configuration instruction or an own attribute, instructing mutual networking among communication nodes of spliced building blocks belonging to a second set in the first network to obtain a second network. The "communication node" may refer to a component used for networking in a building block. The second set may be a set of assembled building blocks of designated communication nodes that need to use the second network for communication, such as direct connection, etc. The second set may also be obtained according to attributes of the assembled building blocks themselves (for example, execution assemblies are automatically classified into the second set), and may also be designated by external intelligent devices such as mobile phones. The second set may preferably be a complete set or a subset of the first set. The second configuration instruction is transmitted by the first network. Specifically, in an embodiment, the master communication node spontaneously informs other nodes to join the second network of the second configuration instruction by the first network. In a varied embodiment, for the second configuration instruction sent by the mobile phone, the second configuration instruction is first sent to a node in the first network by a network such as WiFi, and then the node informs other nodes of the second configuration instruction by the first network to join the second network. Both the first network and the second network are wireless networking networks, and data transmission communication quality of the second network is higher than data transmission communication quality of the first network, wherein communication quality can refer to any one or more quality parameters such as efficiency, speed, real-time, timeliness or accuracy. Further, the data transmission efficiency of the second network is higher than the data transmission efficiency of the first network. The first network may be a broadcast network with low transmission rate, such as a mesh, and the second network can transmit sudden and large transmission data. Specifically, in an embodiment, the first network is a Bluetooth mesh network, and the second network is a Bluetooth direct network. In a varied embodiment, the first network is a WiFi broadcast network and the second network is a WiFi connection network. In another varied embodiment, the first network is RF2.4G broadcast, and the second network is RF2.4G directional connection, etc.

The method for networking of the spliced building blocks includes a step of identifying increase or decrease of the building blocks: identifying and obtaining information of increase or decrease of the building blocks relative to the first set. If the newly added building blocks are ordinary building blocks without electronic modules, the newly added building blocks will have no effect on the first set. Therefore, only the building blocks that can increase or decrease relative to the first set constitute "increase or decrease". The method includes a step of adjusting increase or decrease of the first network: according to the information of increase or decrease of the building blocks, increasing or decreasing the communication nodes in the first network correspondingly.

Figure 3:
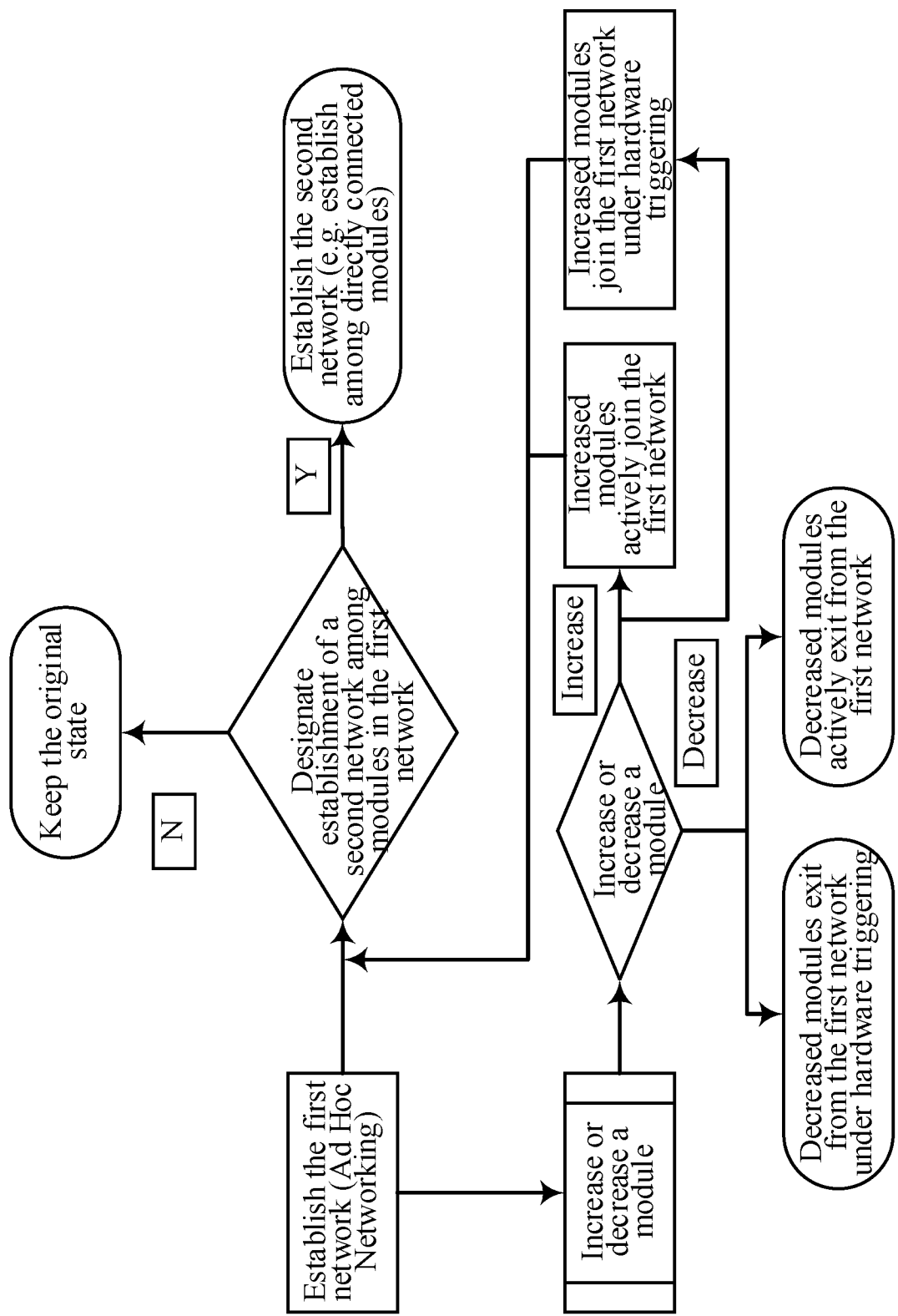
FIG. 3 is a schematic diagram of principles of Ad-Hoc networking of the present invention.
Figure 4:
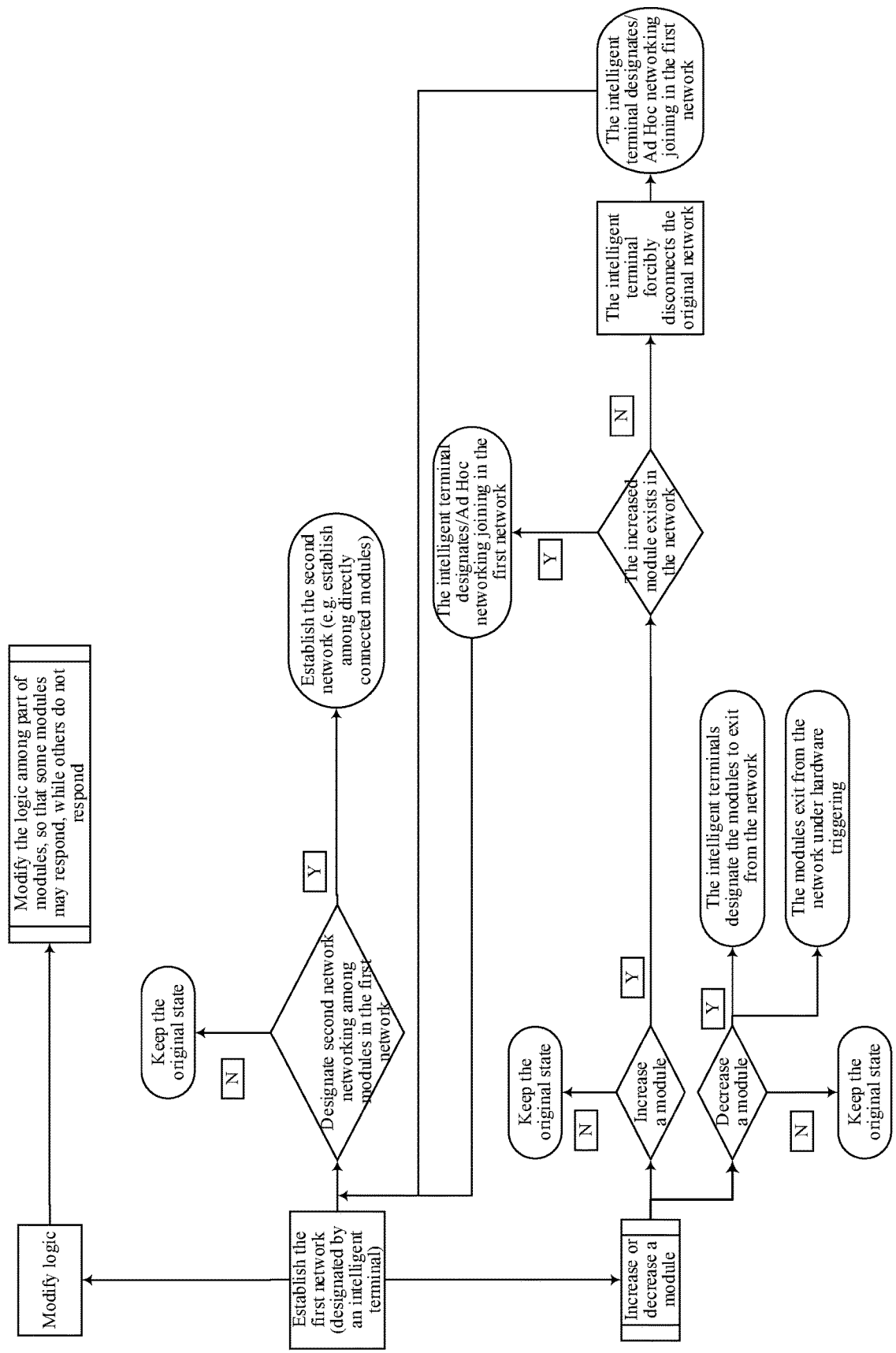
FIG. 4 is a schematic diagram of principles of APP networking of the present invention.

The step of adjusting increase or decrease of the first network includes any one or more of the following steps: a step of actively joining the first network: allowing the increased communication nodes to actively join the first network; a step of actively exiting from the first network: allowing the communication nodes in the first network to actively exit from the first network; a step of joining the first network under hardware triggering: with hardware triggering as a condition, allowing the first network to increase the communication nodes; a step of exiting from the first network under hardware triggering: with hardware triggering as a condition, allowing the first network to decrease the communication nodes; a step of controlling joining the first network: allowing the increased communication nodes to join the first network by the external intelligent terminal; and a step of controlling exiting from the first network: allowing the decreased communication nodes to exit from the first network by the external intelligent terminal. As shown in FIG. 3 and FIG. 4, the communication nodes may join and exit from the first network by themselves. The communication nodes may also join or exit by hardware triggering, that is, a user may join or exit from the first network by self splicing, plugging and unplugging, etc. The communication node may also be controlled to join and exit from the first network by the external intelligent terminal.

The method for networking of the spliced building blocks includes a step of disconnecting the existing network: allowing the increased communication nodes to join the current first network after exiting from the original first network by the external intelligent terminal. Logic of the communication node in the original first network is different from that of the communication node in the current first network, so it is necessary to join the current first network after disconnecting the original first network.

The method for networking of the spliced building blocks includes a step of external adjustment of the first network: according to a logic amendment instruction of the external intelligent terminal, adjusting a topological structure of the first network and/or a topological structure of the second network. As shown in FIG. 4, the user may adjust the topological structure of the first network according to the logic modification instruction of the external intelligent terminal, and modify the logic among all or part of the communication nodes by broadcasting, so that some communication nodes may respond, while others do not. For example, in case that the toy tank is built with spliced building blocks, when the crawler of the toy tank is considered to be hit, the user may modify the topological structure of the first network to temporarily exit the communication node of the execution assembly such as the motor corresponding to the crawler from the first network without responding to the instruction to move the toy tank, so that the toy tank cannot continue to move.

Specifically, in an embodiment, a method for networking of toy car spliced building blocks is as follows: communication nodes, such as Bluetooth Low Energy (BLE) communication modules, are installed on building block assemblies that need networking in toy car spliced building blocks. Assemblies that need networking in toy car spliced building blocks may be divided into sensing assemblies and execution assemblies. The execution assemblies include a motor module A, a motor module B, an light-emitting diode (LED) lamp module and an audio module. The sensing assemblies include a remote controller, a distance sensor and a voice control sensor. The sensing assembly generates control signals, and the execution assembly performs corresponding actions in combination with the control logic according to the control signals. There may be more than one assembly of the same type in a network, which requires independent identification or control. One sensing assembly may control multiple execution assemblies, and one execution assembly may be controlled by multiple sensing assemblies. Parameters of each assembly may be set separately. In a first network (initial networking) of toy car spliced building blocks, the way of ad hoc networking may be adopted, or smart terminals, such as mobile phones, smart watches, smart glasses, smart bracelets, etc., may be used to send networking instructions by the smart terminals for initial networking. The building blocks joining the first network (initial networking) may be determined according to the attributes of the building blocks (for example, an attribute range is set, and only the building blocks that need to transmit data, such as execution assemblies and sensing assemblies, belong to the first set, while ordinary building blocks without electronic modules are not included in the first set); and they may also be specified by smart terminals such as mobile phones, or be determined according to the specific situation when the user finishes splicing.

After the completion of the first network (initial networking), if new assemblies are opened or spliced, the new assemblies may join the first network by themselves, or users may join the communication nodes of new assemblies into the first network by splicing hardware or by sending instructions from intelligent terminals such as mobile phones. If the communication nodes of assemblies that have joined the first network need to exit, the communication nodes may exit from the first network by themselves, or users may exit the communication nodes from the first network by pulling out and removing hardware or by sending instructions from intelligent terminals such as mobile phones.

The networked communication nodes may store and keep networking information without losing after power failure, and may automatically network according to the stored networking information after the next power-on, without user operation or intelligent terminals such as mobile phones sending out the first configuration instructions again. For example, after some efforts, the user spelled out the "Star Car", which has the user's style and is a kind of creation based on the existing materials, and the user must want to keep the achievement. The networked communication nodes may store and keep the networking information. It is precisely in consideration of the needs of users that users may enjoy and play with their own works for a long time. The networked assemblies may also be re-networked, or they may be re-networked by sending logic modification instructions from intelligent terminals such as mobile phones. The toy car spliced building blocks include many assemblies that may form one or more first networks (initial networks).

After the first network (initial network) is set up, the second network needs to be set up in the face of sudden data transmission with large amount and data interaction with high real-time requirements. The data transmission efficiency of the second network is higher than the data transmission efficiency of the first network, and the second network may adopt multi-connection or direct connection. For example, the sensing assembly of the remote controller in the toy car spliced building blocks controls the motor module A and the motor module B, where the motor module A loads the front and rear power of the toy car, and the motor module B is responsible for the steering of the toy car. The remote control car and the motor module establish a second network connection to transmit data, and send and receive other data in the first network by the first network at the same time. The other data especially refers to the data to be transmitted, but not transmitted by the second network, for example, other data in the mesh network may be sent and received by the first network.

The first networks are independent of each other and do not interfere with each other. For example, the spliced building blocks of toy cars are spliced by users into off-road vehicles, sports cars, chariots, etc. The spliced building blocks of off-road vehicles form the off-road vehicle initial network, the spliced building blocks of sports cars form the sports car initial network, and the spliced building blocks of chariots form the chariot initial network. These networks are independent of each other and will not influence each other. Some communication connections may also be established among the three first networks. For example, after the chariot sends out the "bullet", the sports car will give out the sound effect of "being hit", and the sports car will slow down at the same time. However, such communication is inter-network communication, and will not affect the communication within each network.

In order to achieve the better networking effect, a central processing module may also be added. According to the information sent by the communication node, the central processing module obtains the information to be compared of the finished products spliced by users, and compares the information to be compared with the information in the database, so that the type information of the shapes that users are splicing or the type information of the shapes that they want to splice may be obtained. The central processing module may know the networking progress and status of the first network and the second network, and may conduct some interactive activities with the user.

In another varied embodiment, train spliced building blocks only need to build the first network without requiring the second network, which is different from the above embodiment: it is unnecessary to build the second network after the first network (initial network) is built, in the face of sudden data transmission with large amount and data interaction with high real-time requirements. At this time, the first network exists independently, which is enough to support the information transmission of the whole toy car spliced building blocks. Toy car spliced building blocks that may only form the first network are relatively cheap, and may meet the needs of users for products with different prices. There are many assemblies in the train spliced building blocks, which need to be networked by the first network. However, in order to get the scene of the train moving slowly on the rails, such as slow start, slow whistle and slow flashing lights, the signal transmission here does not need the second network with high speed, good real-time and timeliness and good accuracy, and the first network is fully enough. In networking of the train spliced building blocks, the user may splice the building blocks first, specifically, correctly splice locomotive assemblies, assemblies of train compartment 1, assemblies of train compartment 2, assemblies of train compartment 3, assemblies of train compartment 4, assemblies of train compartment 5 and train tail assemblies. At this time, the user may power up the assemblies, and each assembly may form the first network by ad hoc networking, or may also instruct the networking of the first network together with an intelligent terminal such as a mobile phone, a watch and a smart bracelet. The information is communicated in the first network, and the coordination among the modules is completed, so as to achieve the scene of the train moving slowly on the rails, scene of slow start, slow whistle and slow flashing lights. The user may also forcibly remove the assemblies of train compartment 1, the assemblies of train compartment 2, the assemblies of train compartment 3, the assemblies of train compartment 4 and the assemblies of train compartment 5, so that the assemblies of train compartment 1, the assemblies of train compartment 2, the assemblies of train compartment 3, the assemblies of train compartment 4 and the assemblies of train compartment 5 exit from the first network. At this time, there are only locomotive assemblies and train tail assemblies in the first network, and the user may appropriately deform the assemblies, for example, into the shape of a train man. At this time, only the first network is needed. In a varied embodiment, the user may also add the neon assembly of the compartment to the first network, thus forming a new toy shape and simulating the train night scene, in which the neon assembly has low requirements on communication conditions and the first network is fully sufficient. In another varied embodiment, in the networking of the sub-car and main car spliced building blocks, when the sub-car is away from the main car for a certain distance, only the second network needs to be built between the sub-car body assembly and the sub-car remote control assembly. After the sub-car body assembly and the sub-car remote control assembly built the second network, the sub-car remote control assembly may remotely control the forward and backward movement of the sub-car body assembly and the rotation of the steering wheel. This information communication needs high communication efficiency, especially the real-time communication, so it is necessary to build the second network. At the same time, the user may also assemble the thrust assemblies of the sub-cars. At this time, the thrust assemblies of the sub-cars may join the second network by means of an ad hoc network or the way specified by intelligent terminals, and the remote control assemblies of the sub-cars may control the forward and backward movement of the thrust assemblies of the sub-cars. These communications still need high communication efficiency, especially the real-time communication, so it is necessary to set up the second network.

Those skilled in the art may understand the method for networking of the spliced building blocks provided by the present invention as an embodiment of the networking system of spliced building blocks provided by the present invention. That is, the networking system of the spliced building blocks may be realized by executing the step flow of the method for networking of the spliced building blocks.

Spliced building blocks applicable to wireless networking provided according to the present invention include a building block assembly and communication nodes, wherein the communication nodes are disposed in the building block assembly; and each of the communication nodes includes a first network communication module: configured to establish or join a first network according to a first configuration instruction of a locality of the communication node or an external intelligent terminal; and/or a second network communication module: configured to establish or join a second network according to a second configuration instruction from the first network or the locality of the communication node, wherein both the first network and the second network are wireless networking networks, and the data transmission efficiency of the second network is higher than the data transmission efficiency of the first network.

Each of the communication nodes includes a second network configuration module, and the second network configuration module includes a first network node information obtaining module: configured to obtain communication node information of the first network; and a second configuration instruction generation module: configured to generate a second configuration instruction according to the communication node information of the first network. Specifically, in an embodiment, by the topological structure of the first network, total communication nodes are known, and which nodes have larger data transmission amount are known. Then, a communication node with the large data transmission amount is dynamically used as a node of the second network, thereby generating a second configuration instruction. In a varied embodiment, each communication node may store whether its attributes are execution assemblies, sensing assemblies or ordinary assemblies, and then generate a second configuration instruction according to these attributes. The second configuration instruction instructs a communication node set that need to be networked as a second network.

The communication node set includes any one or more of the following communication nodes: a communication node with the corresponding building block assembly serving as a sensing assembly; a communication node with the corresponding building block assembly serving as an execution assembly; a communication node designated by the external intelligent terminal; and a communication node with a data communication traffic larger than a set threshold.

Establishment of the first network is started in any of the following ways: establishment of the first network is started after the communication nodes are powered on; establishment of the first network is started under designation of the external intelligent terminal; and establishment of the first network is started according to historical networking information stored by the communication nodes.

Specifically, in an embodiment, the user wants to build the shape of mantis shrimp with a plurality of spliced building blocks, and the pliers of mantis shrimp are designed as wheels, so that mantis shrimp may turn and crawl with the help of the front wheels, and the spliced building blocks of mantis shrimp are all equipped with BLE. By an intelligent terminal, such as a mobile application (APP), the splicing situation of each assembly of mantis shrimp may be visually observed. If the user wrongly splices the assemblies of mantis shrimp, the APP will remind the user to wrongly splice them until all assemblies of mantis shrimp are spliced correctly, and then the APP automatically sends the first network networking instruction or the user presses the networking instruction to complete the networking of the first network. After that, the mobile APP will continue to analyze according to the information sent by each assembly of mantis shrimp. After confirming that the power module, that is, the front wheel, is installed and connected correctly, the APP will automatically send the second network networking instruction or the user will press the networking instruction to complete the networking of the second network. In another varied embodiment, the user has to build a monkey shape by splicing a plurality of building blocks, and only after the monkey is spliced, the first network is started, otherwise, networking is not conducted. This has the advantage that all the communication nodes that the spliced building block manufacturers expect to join the second network have entered the topological relationship of the first network, so that the communication nodes will not be missed in the networking process of the second network, and then the executive function depending on the transmission control instruction of the second network may be implemented as expected. For example, the expected executive function is that a monkey raises its hand to eat banana-shaped spliced building blocks, and then the banana spliced building blocks emit light. If a child does not splice the banana spliced building blocks in the splicing process, the second network cannot incorporate the banana spliced building blocks, resulting in the failure to realize the executive function that the banana spliced building blocks emit light. Therefore, when the banana spliced building blocks are not spliced correctly, the first network will not be formed, and the prompt that the first network will not be formed due to incorrect splicing may be issued until the banana spliced building blocks are spliced correctly. This may be understood as checking and prompting children's splicing step by step in the splicing process in time, and at the same time, avoiding the premature establishment of the first network to consume electric energy.

Establishment of the second network is started in any of the following ways: establishment of the second network is started after establishment of the first network; establishment of the second network is started under designation of the external intelligent terminal; establishment of the second network is started when a data volume in need of transmission is larger than a set threshold, and the second network is not set up to save electricity if the actual amount of data is not large; and the second network is re-established or adjusted after conversion of a topological structure of the first network.

According to the present invention, the particularity of communication networking in spliced building blocks and similar scenes is fully considered, and the defects in the prior art are pertinently made up. The present invention can distinguish communication needs of different assemblies and adopt different communication schemes under different communication requirements, so that resource configuration is better. The present invention solves the problem that it is difficult to meet requirements of sudden large data size transmission by a Mesh network, while the cost is reduced based on the solution.

Those skilled in the art know that in addition to realizing a system and its various devices and units provided by the present invention by pure computer readable program code, the system provided by the invention and its various devices and units can realize the same functions in the form of logic gates, switches, application specific integrated circuits, programmable logic controllers, embedded micro-controllers or the like completely by logic programming the method steps. Therefore, the system and its various devices and units provided by the present invention can be regarded as a type of hardware components, and the devices and units included in the system for realizing various functions can also be regarded as structures in the hardware component. Devices and units for realizing various functions can also be regarded as both software units for realizing methods and structures in hardware components.

The specific embodiments of the present invention have been described above. It should be understood that the present invention is not limited to the specific embodiments described above, and those skilled in the art may make various changes or modifications within the scope of the claims, which will not affect the substance of the present invention. Without conflicts, the embodiments of this application and the features in the embodiments may be arbitrarily combined with each other.

What is claimed is:

1. A method for networking of spliced building blocks, comprising:
   a step of first network establishment: according to a first configuration instruction or an own attribute, instructing mutual networking among communication nodes of the spliced building blocks belonging to a first set to obtain a first network, wherein the first configuration instruction comes from a locality or an external intelligent terminal, and the first network is a first wireless networking network; and
   a step of second network establishment: according to a second configuration instruction, instructing mutual networking among communication nodes of the spliced building blocks belonging to a second set in the first network to obtain a second network, wherein the second set is a subset of the first set, the second configuration instruction is transmitted by the first network, the second network is a second wireless networking network, and data transmission communication quality of the second network is higher than data transmission communication quality of the first network.

2. The method for networking of the spliced building blocks according to claim 1, further comprising:
   a step of identifying increase or decrease of building blocks: identifying and obtaining information of increase or decrease of the building blocks relative to the first set; and
   a step of adjusting increase or decrease of the first network: according to the information of increase or decrease of the building blocks, increasing or decreasing the communication nodes in the first network correspondingly.

3. The method for networking of the spliced building blocks according to claim 2, wherein the step of adjusting increase or decrease of the first network comprises any one or more of the following steps:
   a step of actively joining the first network: allowing increased communication nodes to actively join the first network;
   a step of actively exiting from the first network: allowing the communication nodes in the first network to actively exit from the first network;
   a step of joining the first network under hardware triggering: with hardware triggering as a condition, allowing the first network to increase the communication nodes;
   a step of exiting from the first network under hardware triggering: with hardware triggering as a condition, allowing the first network to decrease the communication nodes;
   a step of controlling joining the first network: allowing the increased communication nodes to join the first network by the external intelligent terminal; and
   a step of controlling exiting from the first network: allowing decreased communication nodes to exit from the first network by the external intelligent terminal.

4. The method for networking of the spliced building blocks according to claim 2, further comprising:
   a step of disconnecting an existing network: allowing increased communication nodes to join a current first network after exiting from an original first network by the external intelligent terminal.

5. The method for networking of the spliced building blocks according to claim 1, further comprising:
   a step of external adjustment of the first network: according to a logic amendment instruction of the external intelligent terminal, adjusting a topological structure of the first network and/or a topological structure of the second network.

6. A set of spliced building blocks applicable to wireless networking, comprising: a building block assembly and communication nodes, wherein the communication nodes are disposed in the building block assembly;
   each of the communication nodes comprises:
   a first network communication module: configured to establish or join a first network according to a first configuration instruction of a locality of the communication node or an external intelligent terminal, wherein the first configuration instruction instructs mutual networking among the communication nodes of the spliced building blocks belonging to a first set to obtain the first network; and
   a second network communication module: configured to establish or join a second network according to a second configuration instruction received from the first network, wherein a second configuration instruction instructs mutual networking among the communication nodes of the spliced building blocks belonging to a second set in the first network to obtain the second network, wherein the second set is a subset of the first set, wherein the first network and the second network are wireless networking networks, and data transmission efficiency of the second network is higher than data transmission efficiency of the first network.

7. The set of spliced building blocks applicable to wireless networking according to claim 6, wherein each of the communication nodes comprises: a second network configuration module, wherein
   the second network configuration module comprises:
   a first network node information obtaining module: configured to obtain a communication node information of the first network; and
   a second configuration instruction generation module: configured to generate a the second configuration instruction according to the communication node information of the first network, wherein the second configuration instruction instructs a communication node set needing to be networked into the second network.

8. The set of spliced building blocks applicable to the wireless networking according to claim 7, wherein the communication node set comprises any one or more of the following communication nodes:

a communication node with a corresponding building block assembly serving as a sensing assembly;

a communication node with a corresponding building block assembly serving as an execution assembly;

a communication node designated by the external intelligent terminal; and a communication node with a data communication traffic larger than a set threshold.

9. The set of spliced building blocks applicable to the wireless networking according to claim 6, wherein:

establishment of the first network is started in any of the following ways:

establishment of the first network is started after the communication nodes are powered on;

establishment of the first network is started under designation of the external intelligent terminal; and establishment of the first network is started according to historical networking information stored by the communication nodes; and establishment of the second network is started in any of the following ways:

establishment of the second network is started after establishment of the first network;

establishment of the second network is started under designation of the external intelligent terminal;

establishment of the second network is started when a data volume in need of transmission is larger than a set threshold; and the second network is re-established or adjusted after conversion of a topological structure of the first network.

10. A system for networking of spliced building blocks, comprising:

a first network establishment module: configured to, according to a first configuration instruction, instruct mutual networking among communication nodes of the spliced building blocks belonging to a first set to obtain a first network, wherein the first configuration instruction comes from a locality or an external intelligent terminal, and the first network is a first wireless networking network; and a second network establishment module: configured to, according to a second configuration instruction, instruct mutual networking among communication nodes of the spliced building blocks belonging to a second set in the first network to obtain a second network, wherein the second set is a subset of the first set, the second configuration instruction is transmitted by the first network, the second network is a second wireless networking network, and data transmission communication quality of the second network is higher than data transmission communication quality of the first network.

11. The system for networking of the spliced building blocks according to claim 10, further comprising:

an identification module of increase or decrease of building blocks: configured to identify and obtain information of increase or decrease of the building blocks relative to the first set; and an adjustment module of increase or decrease of the first network: configured to, according to the information of increase or decrease of the building blocks, increase or decrease the communication nodes in the first network correspondingly.

12. The system for networking of the spliced building blocks according to claim 11, wherein the adjustment module of increase or decrease of the first network comprises any one or more of the following modules:

a module of actively joining the first network: configured to allow increased communication nodes to actively join the first network;

a module of actively exiting from the first network: configured to allow the communication nodes in the first network to actively exit from the first network;

a module of joining the first network under hardware triggering: configured to, with hardware triggering as a condition, allow the first network to increase the communication nodes;

a module of exiting from the first network under hardware triggering: configured to, with hardware triggering as a condition, allow the first network to decrease the communication nodes;

a module of controlling joining the first network: configured to allow the increased communication nodes to join the first network by the external intelligent terminal; and a module of controlling exiting from the first network: configured to allow decreased communication nodes to exit from the first network by the external intelligent terminal.

13. The system for networking of the spliced building blocks according to claim 11, further comprising:

a module of disconnecting an existing network: configured to allow increased communication nodes to join a current first network after exiting from an original first network by the external intelligent terminal.

14. The system for networking of the spliced building blocks according to claim 10, further comprising:

a module of external adjustment of the first network: configured to, according to a logic amendment instruction of the external intelligent terminal, adjust a topological structure of the first network and/or a topological structure of the second network.

* * * * *